United States Patent
Hong et al.

(10) Patent No.: US 8,017,264 B2
(45) Date of Patent: Sep. 13, 2011

(54) LITHIUM SECONDARY BATTERY WITH HIGH SAFETY AND MANUFACTURING METHOD THEREOF

(75) Inventors: Ji-Jun Hong, Chungcheongnam-do (KR); Duk-Hyung Yum, Daejeon-si (KR); Sung-Wook Moon, Seoul (KR)

(73) Assignee: Kokam Co., Ltd., Sihung-Si, Kyounggi-Do (KR)

( * ) Notice: Subject to any disclaimer, the term of this patent is extended or adjusted under 35 U.S.C. 154(b) by 809 days.

(21) Appl. No.: 10/863,814

(22) Filed: Jun. 8, 2004

(65) Prior Publication Data

US 2005/0069763 A1 Mar. 31, 2005

(30) Foreign Application Priority Data

Sep. 29, 2003 (KR) .................. 10-2003-0067565

(51) Int. Cl.
*H01M 2/00* (2006.01)
*H01M 6/46* (2006.01)
*H01M 6/42* (2006.01)
*H01M 6/12* (2006.01)
*H01M 2/02* (2006.01)

(52) U.S. Cl. ........ 429/153; 429/162; 429/163; 429/177; 429/179; 429/149

(58) Field of Classification Search .................. 429/163, 429/149, 162, 153, 177, 179
See application file for complete search history.

(56) References Cited

U.S. PATENT DOCUMENTS

| | | | |
|---|---|---|---|
| 4,778,479 A | 10/1988 | Römling et al. | |
| 5,372,897 A * | 12/1994 | Kozawa et al. | 429/54 |
| 5,490,867 A * | 2/1996 | Kozawa et al. | 29/623.2 |
| 5,498,489 A | 3/1996 | Dasgupta et al. | |
| 5,537,733 A * | 7/1996 | Kozawa et al. | 29/623.5 |
| 5,667,911 A | 9/1997 | Yu et al. | |
| 5,795,357 A | 8/1998 | Kim | |
| 5,989,741 A | 11/1999 | Bloomfield et al. | |
| 6,235,066 B1 | 5/2001 | Inuzuka et al. | |
| 6,284,405 B2 | 9/2001 | Kaido et al. | |
| 6,287,721 B1 * | 9/2001 | Xie et al. | 429/152 |
| 6,423,449 B1 | 7/2002 | Hong | |

(Continued)

FOREIGN PATENT DOCUMENTS

DE 19540845 A1 5/1996

(Continued)

OTHER PUBLICATIONS

The Random House College Dictionary 1980, Jess Stein, Revised Edition, p. 760.*

(Continued)

*Primary Examiner* — Helen O Conley
(74) *Attorney, Agent, or Firm* — Fredrikson & Byron, P.A.

(57) ABSTRACT

A lithium secondary battery capable of preventing explosion or firing caused by the increase of inner pressure due to misusage is disclosed. The lithium secondary battery includes an electrode assembly having an anode plate, a cathode plate and a separator, a package having a receiving portion for receiving the electrode assembly and sealed and filled with electrolyte together with the electrode assembly, and an adhesive layer at least partially formed on an outer surface of the package. The lithium secondary battery functions as an explosion-proof safety device for preventing the package from exploding due to abrupt breakage of the package when the package is expanded due to the increase of inner pressure of the battery over a critical value.

10 Claims, 14 Drawing Sheets

U.S. PATENT DOCUMENTS

| | | |
|---|---|---|
| 6,426,165 B1 | 7/2002 | Coustier et al. |
| 6,589,300 B2 | 7/2003 | Hong |
| 6,632,538 B1 * | 10/2003 | Yamazaki et al. ............ 428/461 |
| 2003/0008206 A1 | 1/2003 | Hong |
| 2003/0054239 A1 * | 3/2003 | Watanabe et al. ............. 429/152 |
| 2004/0067376 A1 | 4/2004 | Arao et al. |
| 2004/0241541 A1 | 12/2004 | Watanabe et al. |

FOREIGN PATENT DOCUMENTS

| | | |
|---|---|---|
| EP | 0 602 976 A1 * | 12/1993 |
| EP | 0 682 376 A1 | 5/1995 |
| EP | 1276161 A1 | 1/2003 |
| EP | 1102336 B1 | 5/2004 |
| JP | 2003-203612 | 7/2003 |

OTHER PUBLICATIONS

B.K. Petrin, *Chemical Sources of Electrical Current with a High Energy Capacity*, Moscow, VINITI, pp. 76, 77 (1986).

European Patent Office, Examination Report, Aug. 24, 2010, pp. 1-4; EP1519428 (A2), published Mar. 30, 2005.

* cited by examiner

LITHIUM SECONDARY BATTERY WITH HIGH SAFETY AND MANUFACTURING METHOD THEREOF

BACKGROUND OF THE INVENTION

1. Field of the Invention

The present invention relates to a lithium secondary battery, and more particularly to a lithium secondary battery capable of preventing explosion or firing caused by the increase of inner pressure due to misusage.

2. Description of the Related Art

Generally, portable electronic products such as a video camera, a mobile phone and a notebook computer become lighter and smaller and are designed to have various functions. In addition, as an electric automobile, an energy storage battery, a robot and a satellite are regularized, various research and development concerning a battery used as a power source of them have been extensively performed. Such a battery is usually made to be rechargeable and can be used continuously.

Usually, a nickel-cadmium battery (NiCd battery), a nickel metal hydride battery (NiMH battery), a nickel-zinc battery (NiZn battery), a lithium secondary battery or the like is used as a power source of electronic appliances, and the lithium secondary battery among them becomes generally popularized in consideration of its life cycle and capacity.

According to the kind of electrolyte, the lithium secondary battery can be classified into a lithium metal battery and a lithium ion battery which use a liquid electrolyte, and a lithium polymer battery using a polymer solid electrolyte. Depending on the kind of polymer solid electrolyte, the lithium polymer battery can also be classified into a full-solid lithium polymer battery containing no organic electrolyte and a lithium ion polymer battery using a gel polymer electrolyte containing organic electrolyte.

The lithium secondary battery includes an electrode assembly having an anode collector (aluminum or nickel, for example), an anode active material layer (polymer anode material such as metal oxide, carbon black, metal sulfide, electrolytic liquid, and polyacrylonitrile, for example), an electrolytic layer (organic solid electrolyte or gel electrolyte derived from lithium salt or carbonate electrolytic liquid such as propylene carbonate, ethylene carbonate, dimethyl carbonate, and ethylene methylcarbonate), a cathode active material (polymer cathode material such as lithium metal, alloys, carbon, electrolytic liquid, and polyacrylonitrile), and a cathode collector (copper, nickel or stainless steel); and a case for packaging the electrode assembly.

The lithium secondary battery generally uses Li-metal or carbon materials for the cathode active material. However, since Li-metal may cause explosion due to a short circuit of the battery caused by formation of resin dentrite when being used as a cathode material, Li-metal becomes substituted with carbon materials. The anode active material generally adopts Li-metal oxide, for example complex metal oxides such as $LiMn_2O_4$, $LiMnO_2$, $LiCoO_2$, $LiNiO_2$, $LiNil\ XCoxO_2$ ($0<x<1$). Electrode materials in Mn group such as $LiMn_2O_4$ and $LiMnO_2$ are advantageous in that they are easily composed, relatively inexpensive, and less causing pollution to environments, but they disadvantageously have small discharging capacity. Particularly, in case of $LiMn_2O_4$, $LiCoO_2$ and $LiNiO_2$, the discharging capacity is smaller than that of other active materials, the discharging capacity is abruptly reduced in charging/discharging, and the life of the battery is seriously deteriorated due to elution of manganese when charging/discharging is continued at high temperature. $LiCoO_2$ shows good electric conductivity, high battery voltage and excellent electrode characteristics, and it is a typical anode electrode material manufactured and marketed by many companies like Sony. However, $LiCoO_2$ has a disadvantage of high price. $LiNiO_2$ is relatively inexpensive among the mentioned anode electrode materials and shows the highest discharging capacity. However, $LiNiO_2$ is not easily composed, and the high discharging capacity may spoil the stability of battery.

On the other hand, since the battery shows its characteristics through complex reactions of anode/electrolyte, cathode/electrolyte and so on, one of main factors for improving performance of the battery is to use suitable electrolyte. Conventionally, the role of electrolyte is just expected as a medium for moving lithium ions, and the electrolyte is used only for that purpose. Recently, it has been revealed that the electrolyte may be resolved during the charging/discharging of battery, and this resolving is fatal to the performance of battery. Accordingly, the carbonate solvent is known as most suitable for electrolyte of the high-potential lithium secondary battery, thereby widely used now. However, this electrolyte has a disadvantage that it may be easily fired due to external factors or at high temperature since the electrolyte is organic solvent.

For the sealed battery using organic solvent and having high energy density, breakdown, overcharging or misuse of relevant machinery including a charger may cause chemical reaction, thereby generating abnormal gas in the battery. This abnormal gas makes the inner pressure of the battery be excessive, thereby resulting in accidents such as breakage of the battery due to the excessive pressure in the battery or damage on an electronic equipment using the battery as a power source. Thus, a method for improving stability of the lithium secondary battery by preventing such accidents is vigorously researched. Representatively, the method is either mixing an overcharging restrainer into electrolyte or using an explosion-proof safety device.

In the former case of mixing an overcharging restrainer, a phosphatic solvent is additionally added to a carbonate solvent. This method shows an improvement feature in stability, but shows problems in the fundamental battery performance like the increase of irreversible capacity and the deterioration of life cycle. In particular, the resolution of the phosphatic solvent increases the irreversible capacity excessively during the charging/discharging, so the battery performance is significantly deteriorated.

In the latter case using an explosion-proof safety device, an explosion-proof safety device which opens a valve or breaks up the case when the inner pressure in the battery exceeds a set value is already used. However, an important problem to be solved for the explosion-proof safety device is accurate control, namely controlling the valve to be accurately opened or the case to be broken up as desired, when the inner pressure reaches a set value. For example, the valve should not be opened before the inner pressure reaches a set value and the value should be opened if the inner pressure of the battery reaches the set value. Thus, the explosion-proof safety device requires much time and cost for production of batteries.

In addition, since the non-liquid electrolyte secondary battery has a danger of firing due to abrupt increase of temperature, there is proposed an explosion-proof safety device for completely cutting off electricity prior to emission of gas by sensing the inner pressure. For example, Japanese Patent Laid-open Publication Heisei 6-196150 discloses a device having a conductive partition deformed vertically and sealing the battery, and a welding plate welded to the partition in connection with a lead. In the device, the increase of an inner pressure makes the partition expanded, so a welding point of the partition is separated from the welding plate to cut off electricity.

However, this explosion-proof safety device requires that the partition and the welding plate be welded at a low temperature so that they may be separated at a certain inner pressure. Thus, the supersonic welding which allows welding with low strength is used. The supersonic welding however just fuses the surface of the welding point by means of vibration heating, so the welding strength is seriously irregular. Since the above-mentioned explosion-proof safety device sets an electricity cutoff pressure depending on the wending strength of the welding point, the electricity cutoff pressure is changed according to such irregular welding strength. Thus, it is impossible to set the electricity cutoff pressure at one value. As a result, the electricity may be cut off before the inner pressure of the battery reaches a predetermined level, or contrarily, the electricity may not be cut off though the inner pressure of the battery exceeds a predetermined level.

SUMMARY OF THE INVENTION

The present invention is designed to solve such problems of the prior art, and therefore it is an object of the present invention to provide a lithium secondary battery having high stability with simple configuration requiring low costs, and its manufacturing method.

In order to accomplish the above object, the present invention provides a lithium secondary battery which includes an electrode assembly having an anode plate, a cathode plate and a separator; a package having a receiving portion for receiving the electrode assembly, the receiving portion being sealed and filled with electrolyte together with the electrode assembly; and an adhesive layer at least partially formed on an outer surface of the package.

Here, the adhesive layer is preferably made of one selected from the group consisting of acrylic resin, EVA (Ethylene Vinyl Acetate) resin, polyamide resin, and rubber.

In addition, it is preferable that the separator is made of a single sheet, folded in a shape of fold-to-fold, and the electrode assembly is configured so that a plurality of the anode plates and a plurality of the cathode plates are laminated in turns with the folded separated being interposed therebetween.

In another aspect of the present invention, there is also provided a set battery in which a plurality of the lithium secondary batteries mentioned above are connected in parallel or in series, and a plurality of the lithium secondary batteries connected in parallel or in series are put into a pack having anode and cathode terminals.

According to perform the above object, the present invention also provides a method for manufacturing a lithium secondary battery which includes the steps of: (a) preparing an electrode assembly having an anode plate, a cathode plate and a separator; (b) putting the electrode assembly into a package together with electrolyte and then sealing the package; (c) forming an adhesive layer at least partially on an outer surface of the package; and (d) curing the adhesive layer.

In another aspect of the invention, there is also provided a method for manufacturing a lithium secondary battery which includes the step of: (a) preparing an electrode assembly having an anode plate, a cathode plate and a separator; (b) making a plurality of single batteries by putting the electrode assembly into each package together with electrolyte and then sealing the package; (c) making a set battery by connecting a plurality of the single batteries in parallel or in series; (d) putting the set battery into a pack having anode and cathode terminals; (e) forming an adhesive layer at least partially on an outer surface of the set package; and (f) curing the adhesive layer.

At this time, the adhesive layer is preferably made of one selected from the group consisting of acrylic resin, EVA resin, polyamide resin, and rubber, and the adhesive layer is formed either by coating or spraying an emulsion or paste adhesive on the outer surface of the package or by soaking the sealed package in an emulsion or paste adhesive.

BRIEF DESCRIPTION OF THE DRAWINGS

Other objects and aspects of the present invention will become apparent from the following description of embodiments with reference to the accompanying drawing in which:

FIG. 2b is a plane view showing an anode or cathode plate of FIG. 2a;

DESCRIPTION OF THE PREFERRED EMBODIMENT

Hereinafter, preferred embodiments of this present invention will be described in detail with reference to the accompanying drawings. However, terms and vocabularies used herein should not be construed as limited to general and dictionary meanings but as based on the meanings and concepts in accordance with the spirit and scope of the invention on the basis of the principle that the inventor is allowed to define terms as the appropriate concept for the best explanation. Therefore, the description herein should not be construed as limiting the scope of the invention but as merely providing illustrations of the presented embodiments of this invention. It will be understood that other variations and modifications could be made thereto without departing from the spirit and scope of the invention.

Figure 1:
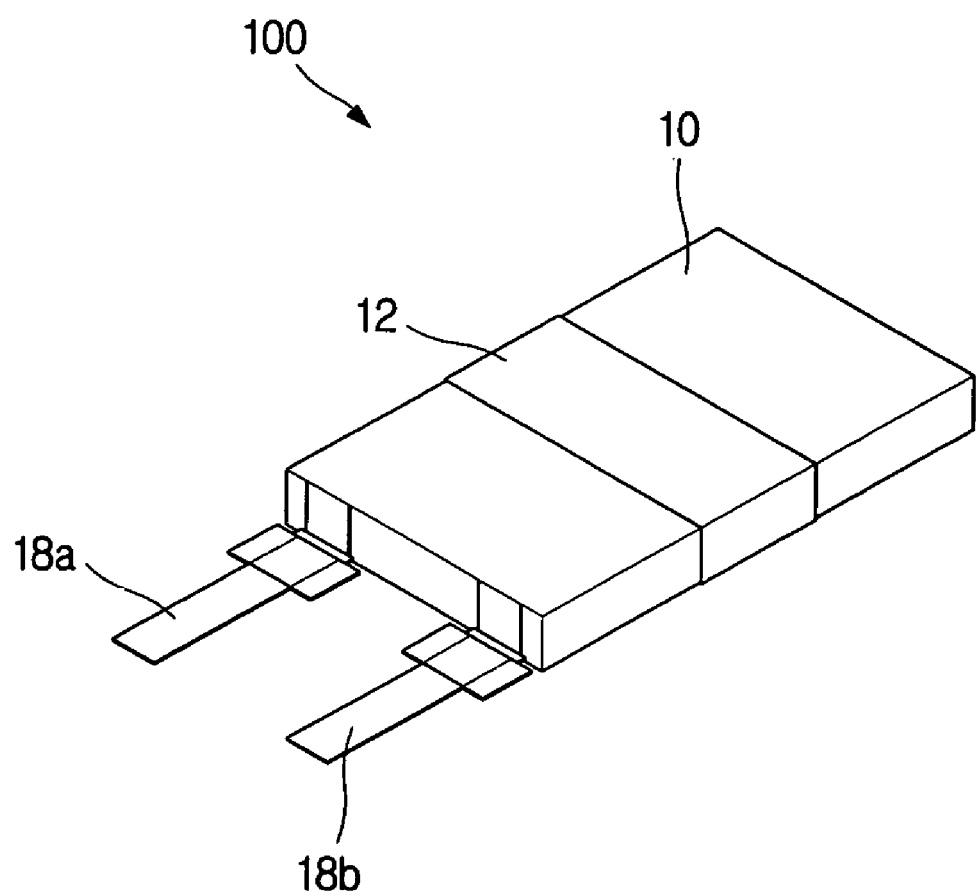
FIG. 1 is a perspective view showing an electrode assembly of a lithium secondary battery according to an embodiment of the present invention.
Figure 2A:
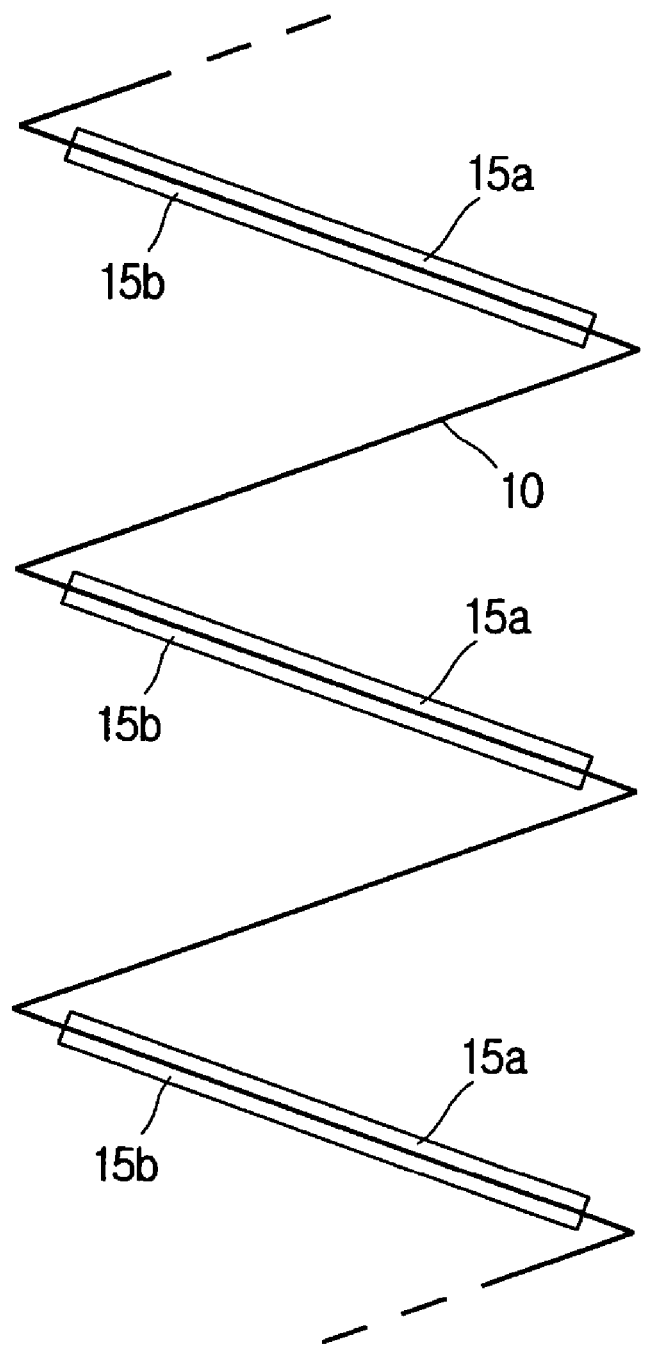
FIG. 2a is a partial sectional view schematically showing a disassembled state of the electrode assembly of FIG. 1.
Figure 2B:
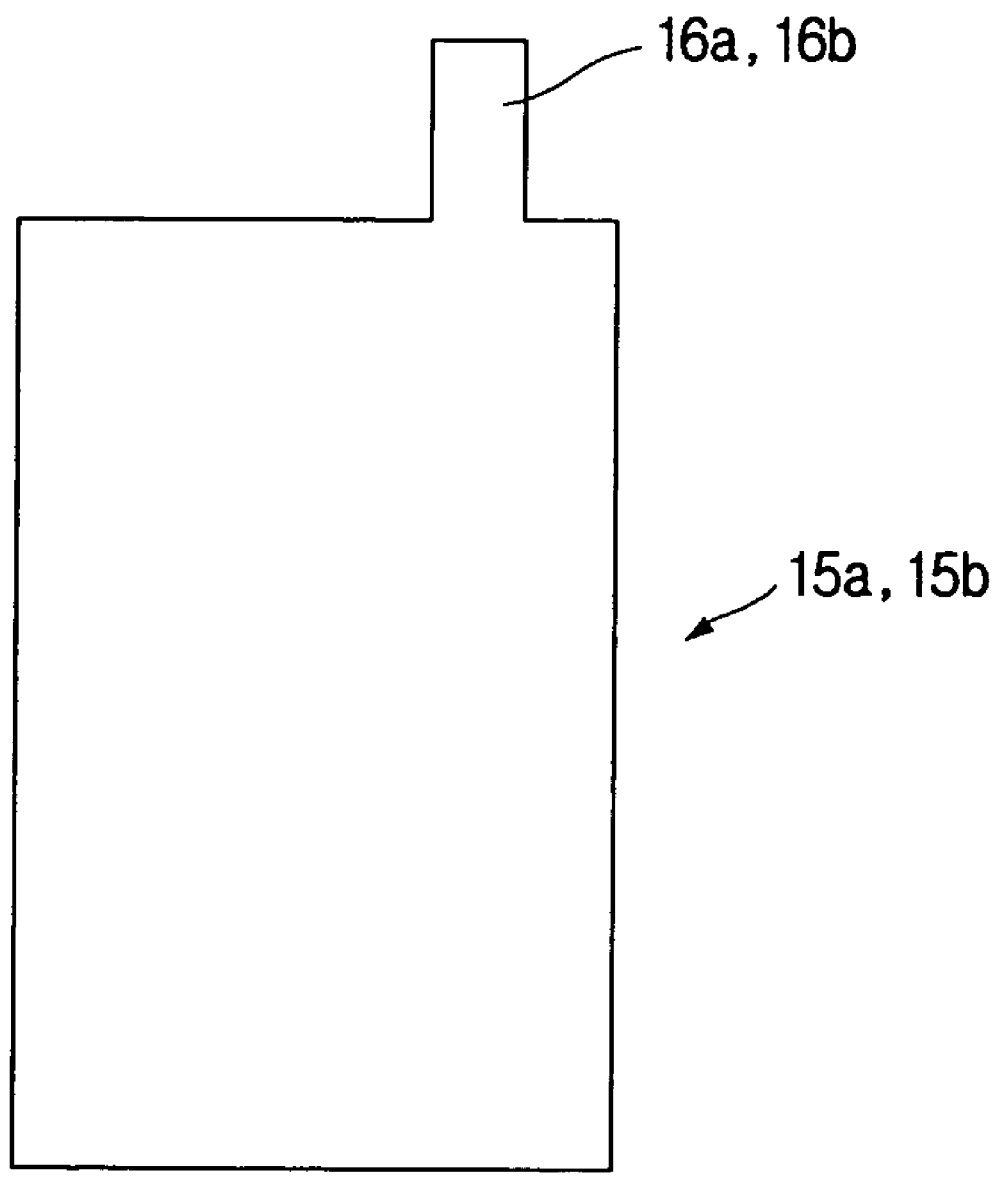

FIG. 1 is a perspective view showing an electrode assembly of a lithium secondary battery according to a preferred embodiment of the present invention, FIG. 2a is a partial sectional view schematically showing a dissembled state of the electrode assembly of FIG. 1, and FIG. 2b is a plane view showing anode and cathode plates of FIG. 2a.

The lithium secondary battery of this embodiment includes an electrode assembly 100 as shown in FIG. 1, a package 20 (see FIGS. 3 to 5) for receiving and sealing the electrode assembly 100, and an adhesive layer 30 (see FIGS. 6a to 6c) formed and cured on the surface of the package 20.

Referring to FIGS. 1, 2a and 2b, the electrode assembly 100 may be theoretically a lithium secondary ion battery or a lithium secondary polymer battery. In addition, the electrode assembly 100 may be any of a unit cell in which an anode plate 15a, a separator 10 and a cathode plate 15b are laminated in order, and a Bi-cell in which they are laminated in order of the anode plate 15a, the separator 10, the cathode plate 15b, the separator 10, the anode plate 15a, the separator 10 and the cathode plate 15b. Such a unit cell or a Bi-cell may be piled up to have multi layers.

Each of the anode plate 15a and the cathode plate 15b is composed of a plate body and an anode or cathode grid 16a or 16b protruded from the plate body. The anode and cathode grids 16a and 16b may be arranged to be opposite to each other on the basis of a longitudinal direction of the electrode assembly 100, but preferably the anode and cathode grids 16a and 16b are positioned toward the same direction on the basis of a longitudinal direction of the electrode assembly 100. The anode/cathode grid 16a or 16b of the anode/cathode plate 15a or 15b is respectively connected to an anode tap 18a or a cathode tap 18b by means of welding or the like.

Generally, the electrode assembly 100 is distinguished from the battery, in itself, in which the electrode assembly 100 is received in the package 20, and the package 20 is filled with electrolyte liquid (not shown) and hermetically sealed. Although the electrode assembly may have any of various structures described above, the electrode assembly 100 of the present invention preferably has a laminated structure in a shape of fold-to-fold in which a plurality of anode plates 15a and a plurality of cathode plates 15b are alternatively laminated with a sheet-shaped separator 10 being interposed therebetween. The fold-to-fold shape of the electrode assembly 100 is now described.

In the electrode assembly 100, the anode plate 15a is fabricated by coating anode active material on one or both faces of a foil collector, for example an aluminum foil collector, and then drying the anode active material. The anode grid 16a is protruded at a region of the collector where the anode active material is not coated. The cathode plate 15b is fabricated by coating cathode active material on one or both faces of a foil collector, for example a copper foil collector, and then drying the cathode active material. The cathode grid 16b is protruded at a region of the collector where the cathode active material is not coated.

The separator 10 has a porous polymer film made of polyethylene (PE) or polypropylene (PP), and has a single-layered or multi-layered structure. The separator 10 includes adhesion portions to which the anode and cathode plates 15a and 15b are respectively adhered, an insulation portion for insulating the anode and cathode plates 15a and 15b between the adhesion portions, and a winding portion for winding several times the surface of a lamination in which the anode/cathode plates are laminated. Here, the adhesion portion and the insulation portion are formed in order, and the insulation portion has a length slightly longer than that of the adhesion portion. Since the insulation portion is folded at a side of the anode/cathode plate 15a and 15b, the insulation portion should have an additional length at least as much as the thickness of the anode/cathode plate 15a and 15b, while the adhesion portion may have a length identical to the width of the anode plate 15a and the cathode plate 15b. On the other hand, the winding portion preferably has a length sufficient for winding the lamination.

On the surface of the separator 10, coated is an ion-conductive polymer adhesive (not shown) for adhering the anode and the cathode plates 15a and 15b to the separator 10 with ensuring conductivity of lithium ions. For example, the ion-conductive polymer adhesive employs an SBR Latex adhesive, an acrylic solvent adhesive, an adhesive using PAN (homo, co-polymer), an adhesive using PAN/PVDF (Polyvinylidene Fluoride) blending, an solvent-type adhesive using MMA (Methyl Methacrylate)/PMMA (Poly Methyl Methacrylate), and so on. The separator 10 is formed in a zigzag shape (more specifically, in a fold-to-fold shape) so that the anode and cathode plates are alternated), and then fixed by a tape 12 for convenience of subsequent processes.

Figure 3:
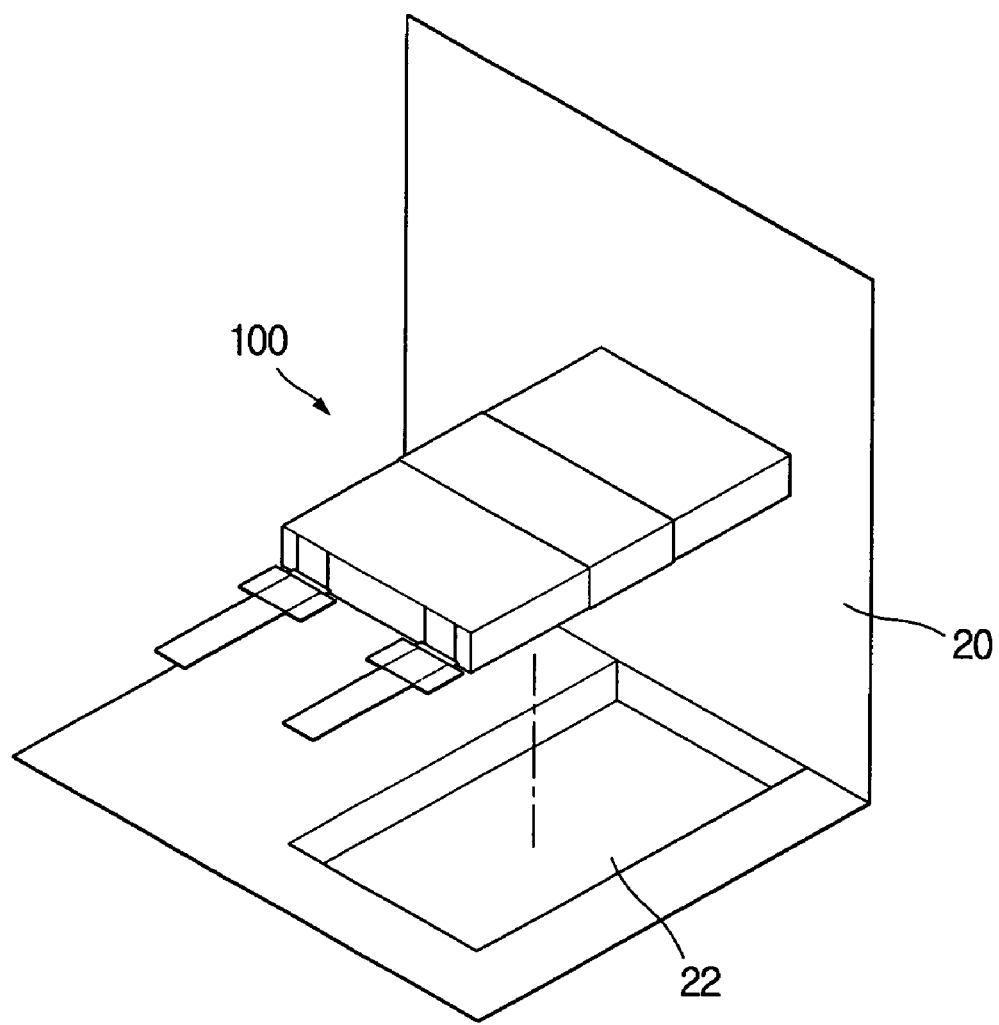
FIGS. 3 to 5 are perspective views for illustrating the process of manufacturing the lithium secondary battery according to an embodiment of the present invention.
Figure 4:
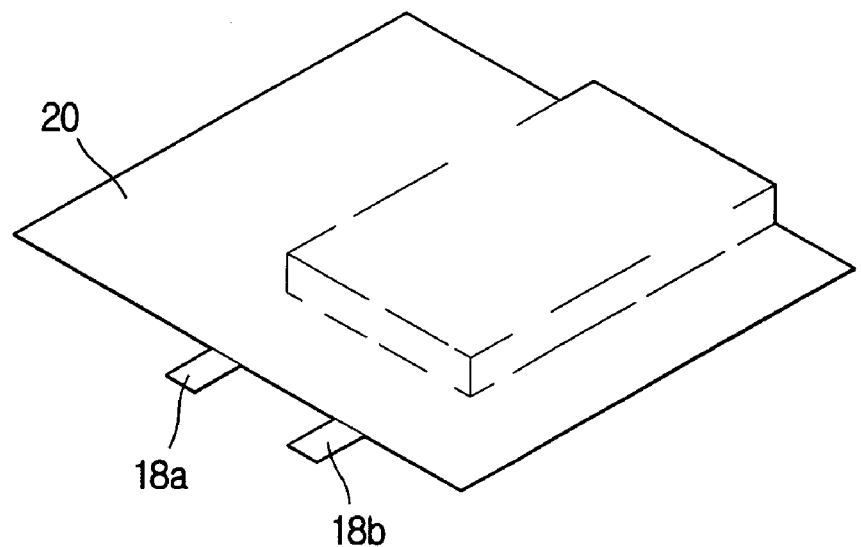
Figure 5:
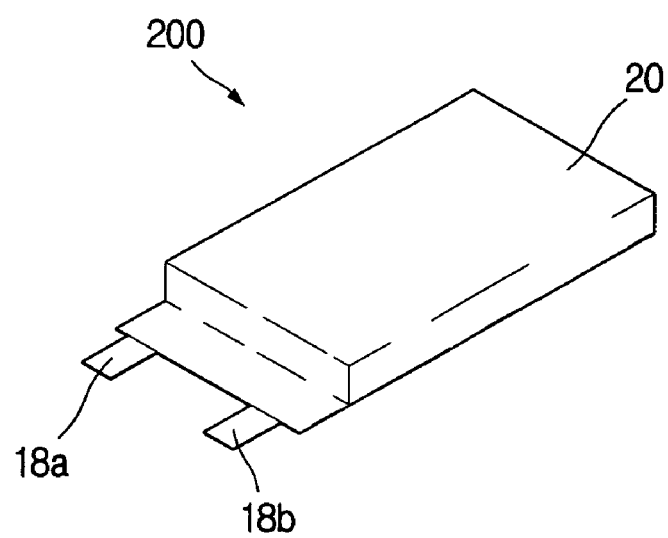

The electrode assembly 100 prepared as above is then received in the package 20 together with electrolyte (not shown), and then sealed to make a single battery of the lithium secondary battery 200, as shown in FIGS. 3 to 5.

The package 20 is preferably a pouch package made of lamination of aluminum and sealant. The package 20 is also preferably an embossing-type package having a concave portion (or, a receiving portion, 22) formed by pressing the lamination so that the electrode assembly is received in the receiving portion 22. The embossing-type package may give more compact packaging, compared with the pouch package.

The package 20 is preferably made of a thin aluminum having a thickness of about 20 to 50 μm. Polypropylene having a thickness of about 30 μm is laminated by means of adhesive on the inner surface of the package 20, namely on the surface toward the electrode assembly 100 received therein. On the while, a nylon film is laminated by means of adhesive on the outer surface of the aluminum.

Subsequently, the outer surface of the single-type lithium secondary battery 200, the outer surface of the package 20, is coated with the adhesive layer 30. The kind of the adhesive layer 30 used in this case is not limited if it is capable of fixing on the outer surface of the package 20, but the adhesive layer 30 preferably employs acryl resin, EVA (ethylene vinyl acetate) resin, polyamide resin or rubber.

Figure 6A:
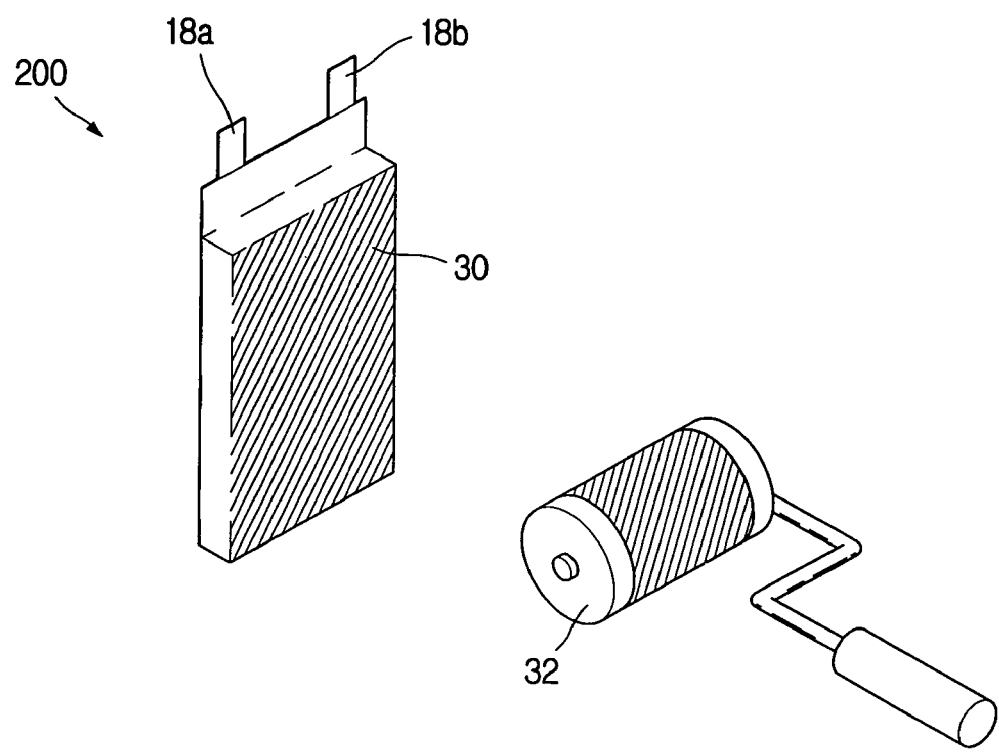
FIGS. 6a to 6c are perspective views for illustrating the process of forming an adhesive layer on the outer surface of the lithium secondary battery according to an embodiment of the present invention.
Figure 6B:
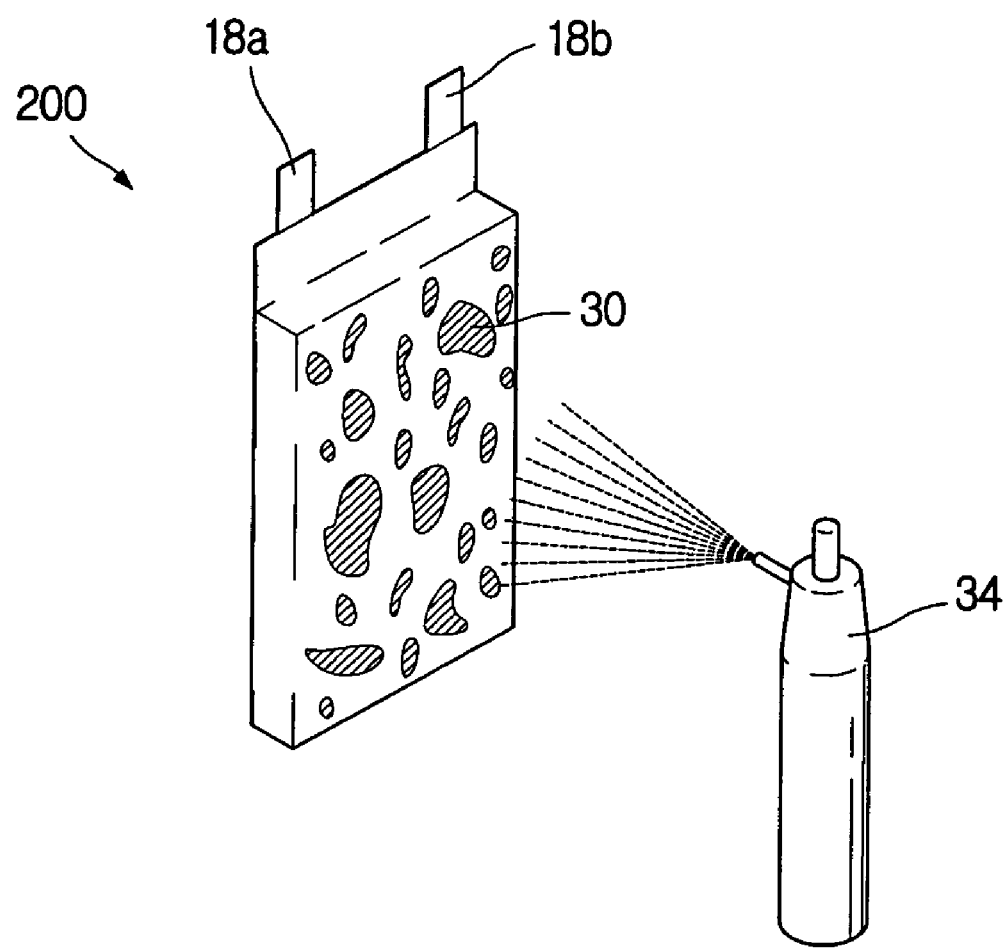
Figure 6C:
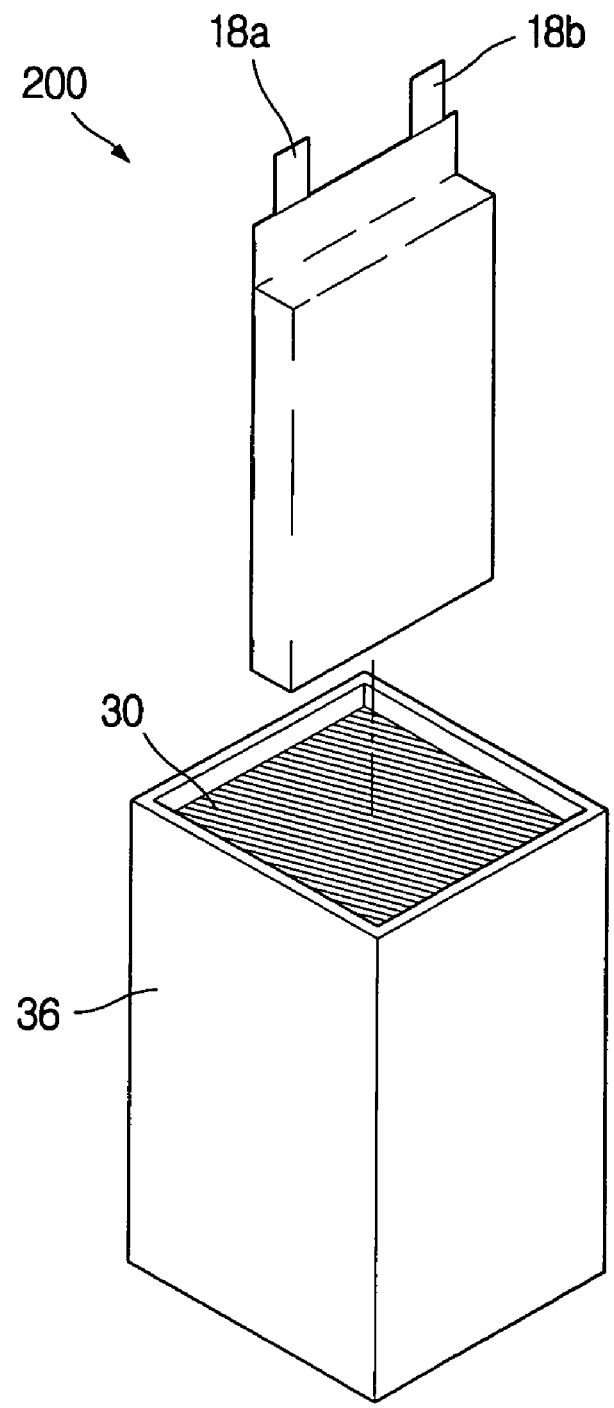
Figure 7A:
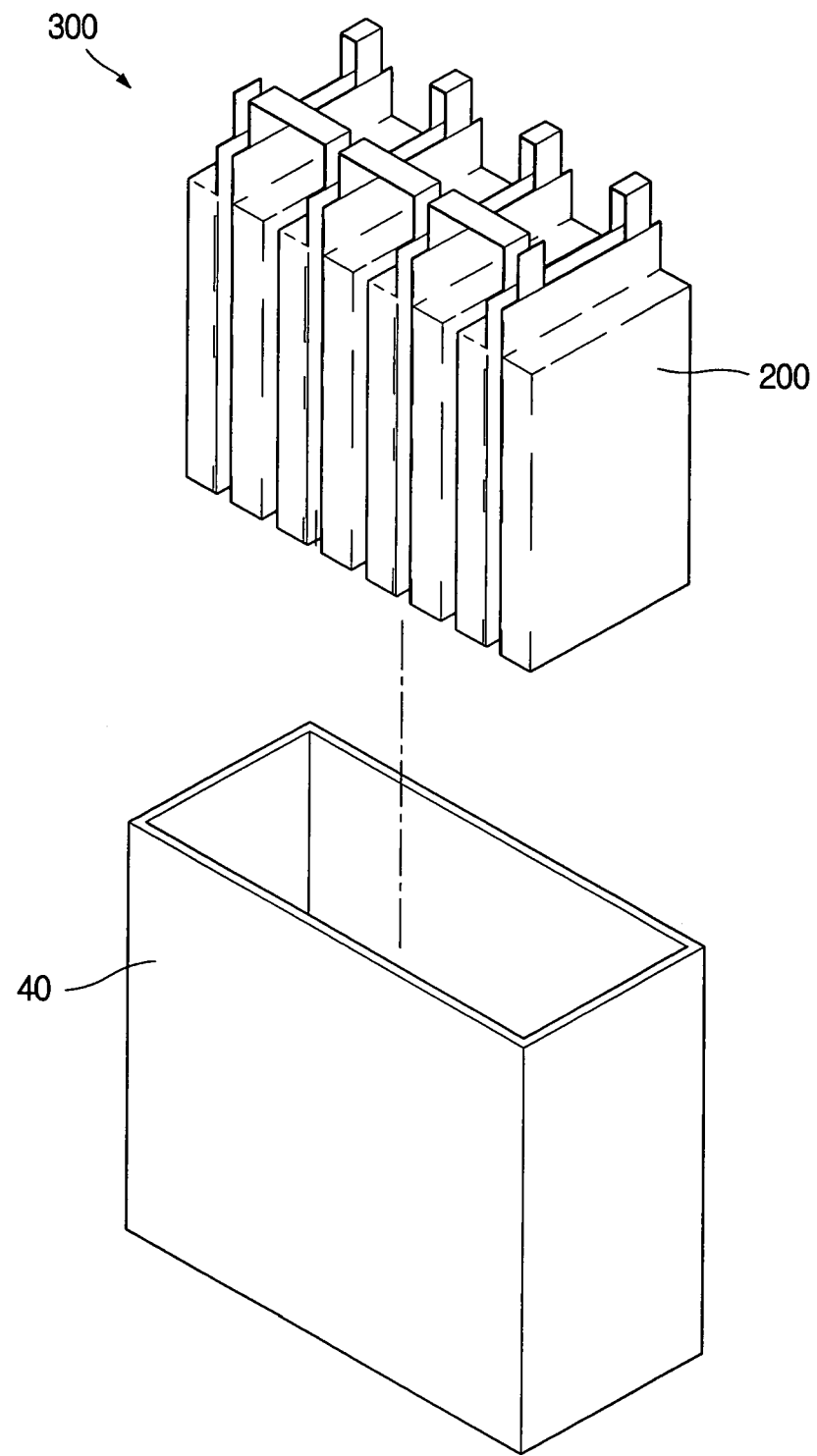
FIGS. 7a to 7d are perspective views for illustrating the process of manufacturing a set battery in which a plurality of lithium secondary batteries are connected according to an embodiment of the present invention.
Figure 7B:
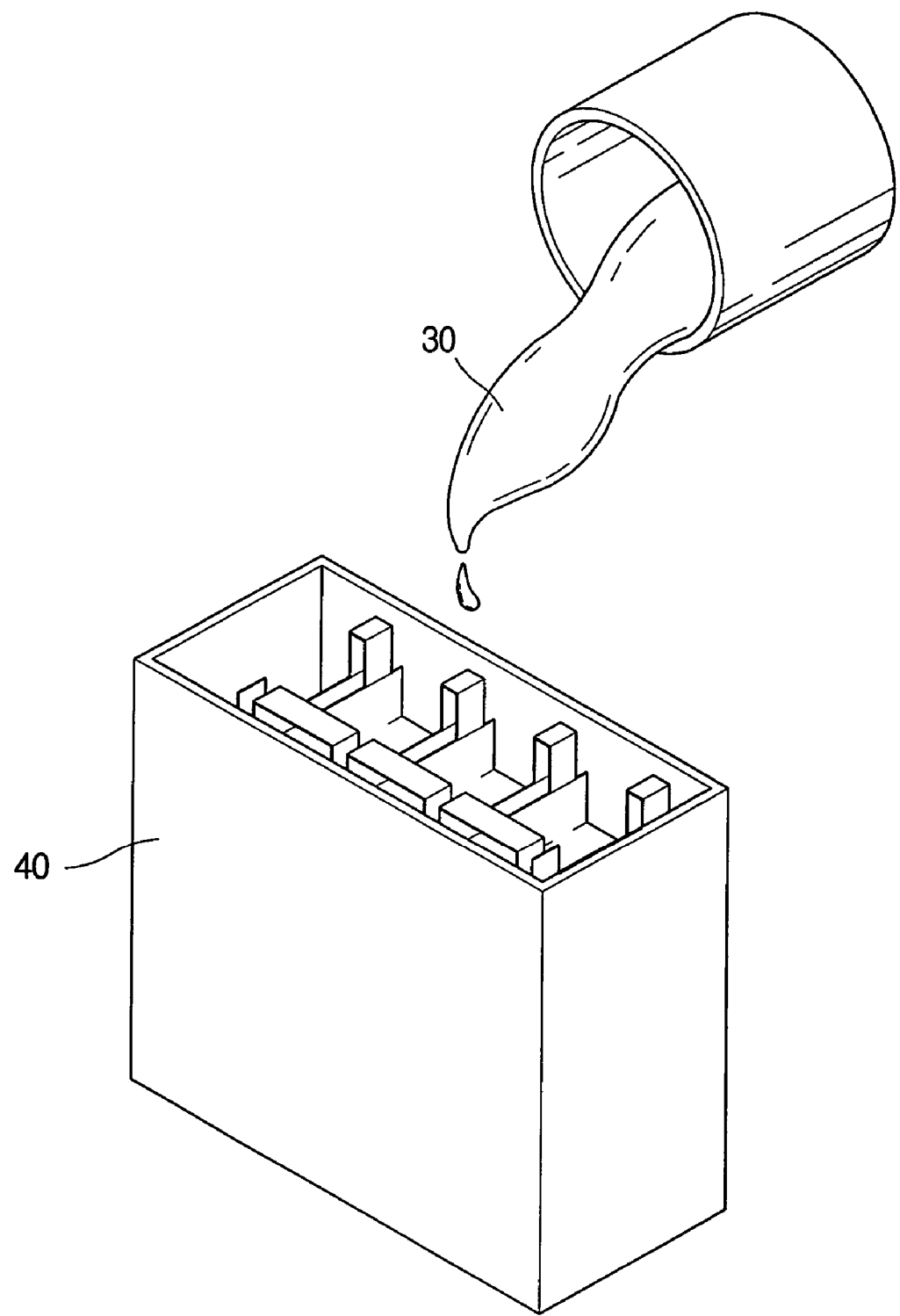
Figure 7C:
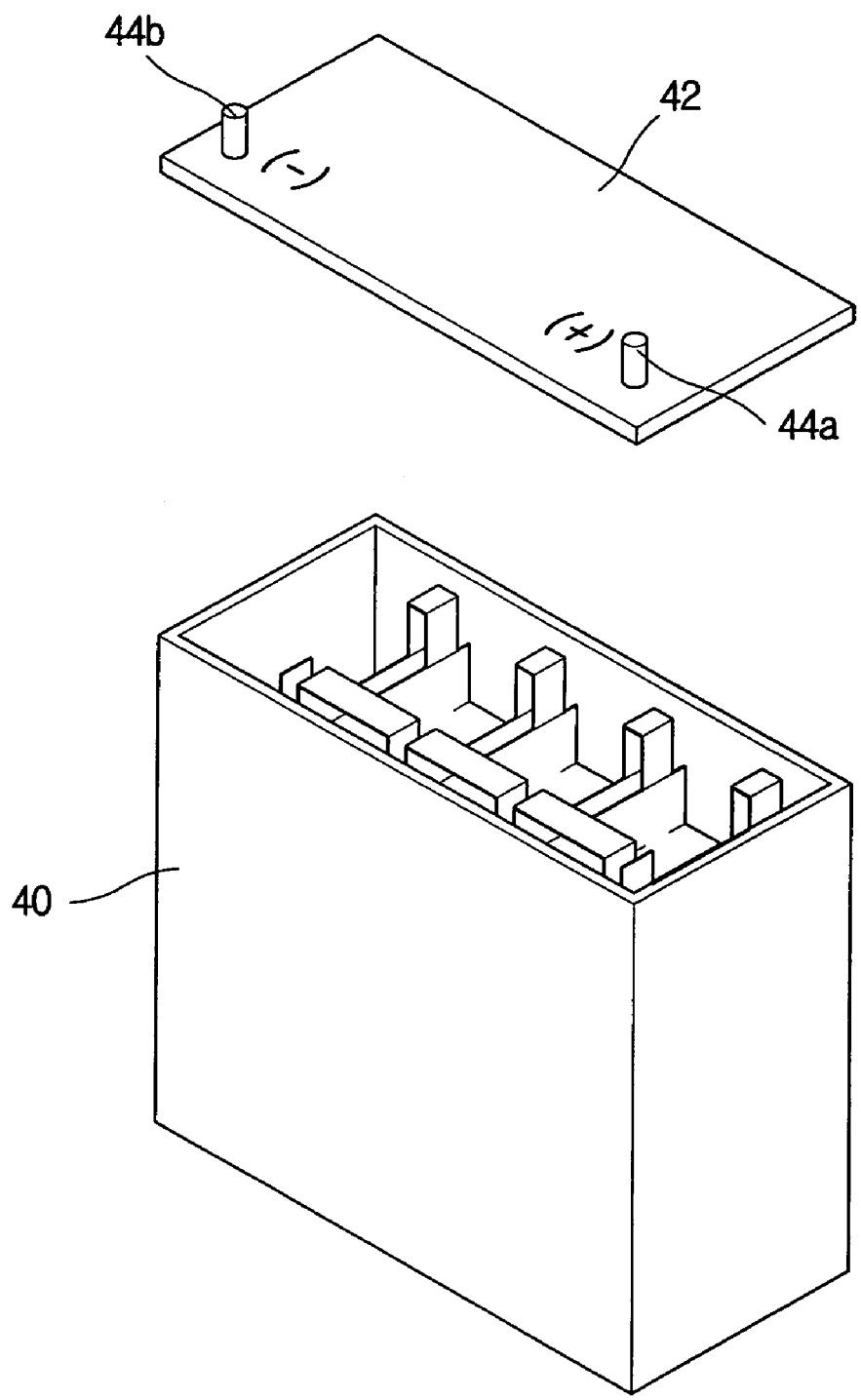
Figure 7D:
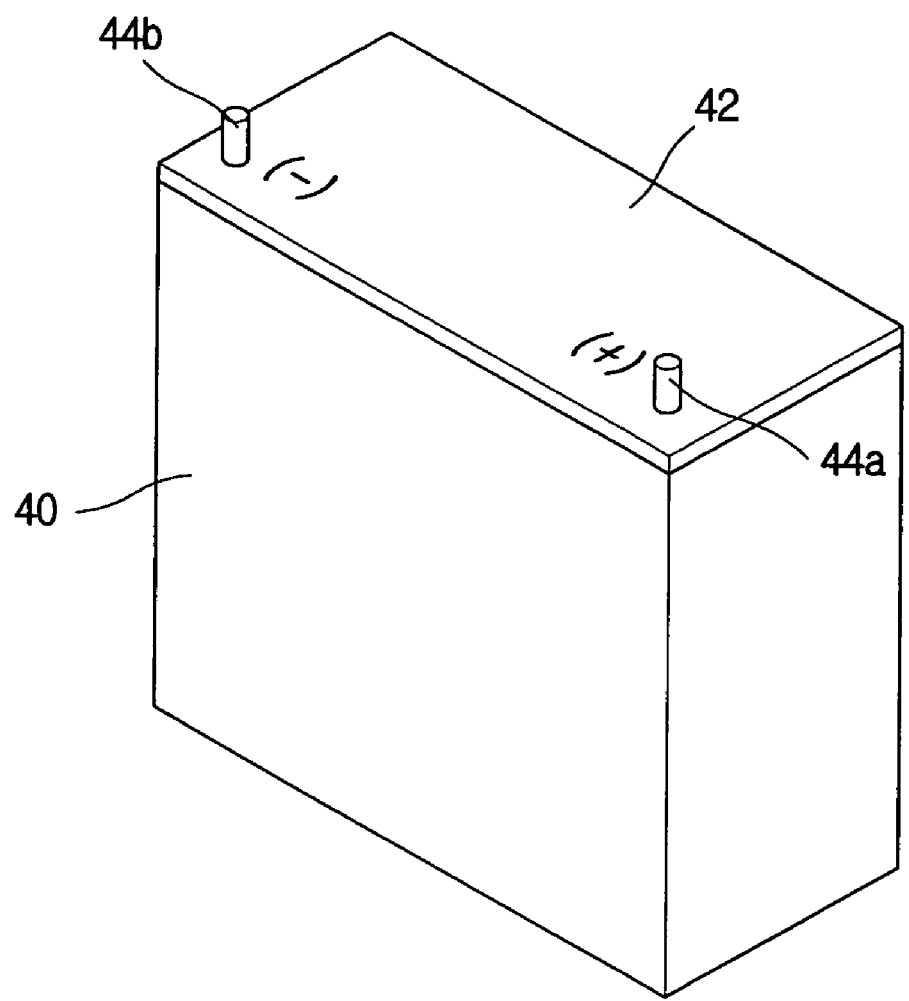

The adhesive layer 30 is preferably in an emulsion or paste state when coated for safe coating. To describe the coating process of the adhesive layer 30 more specifically, an emulsion or paste adhesive is smeared on the outer surface of the lithium secondary battery 200 by using a roller 32 as shown in FIG. 6a, or a sprayer 34 is used for coating the adhesive as shown in FIG. 6b. In addition, as shown in FIG. 6c, it is also possible to soak the lithium secondary battery 200 into a container 36 containing the adhesive in order to coat the adhesive layer 30 on the lithium secondary battery 200.

At this time, the pattern or thickness of the adhesive layer 30 may be selected variously. That is, the adhesive may be coated over the entire surface of the package 20 with a regular thickness, or may be coated partially thereon. The pattern or thickness of the adhesive layer 30 may be suitably selected on consideration of the cohesive power of the cured adhesive layer and the desired inner pressure of the battery.

Then, the coated adhesive layer 30 is cured. For curing the adhesive layer 30, the adhesive layer 30 is either heated at a suitable temperature for a suitable time or dried naturally without heating depending on the kind of the used adhesive. In some cases, the adhesive layer 30 may be cured by radiating ultraviolet rays thereto.

The adhesive layer 30 formed and cured as described above functions as an explosion-proof safety device for preventing firing or explosion of the lithium secondary battery 200. In other words, when overcharging or misuse of the lithium secondary battery or breakdown of an electronic equipment using the battery causes chemical reaction in the battery, and thereby makes the package 20 be shrunk or expanded due to the change of the inner pressure of the battery, the adhesive layer 30 having strong cohesive force suitably restrains the shrinkage or expansion of the package 20, thereby controlling breakage of the package 20 or breakdown of the seal and reducing the area of the electrode assembly to be contacted with atmosphere when the seal is broken down. Thus, firing or explosion of the battery may be prevented.

On the other hand, the lithium secondary battery of the present invention may be configured into a set battery in which a plurality of single batteries are connected in series or in parallel. To make the set battery, after preparing a plurality of single batteries 200 each having the adhesive layer 30 thereon, the single batteries 200 are put into a case or a pack with their anode and cathode taps 18a and taps 18b being connected in parallel or in series. Or else, as shown in FIGS. 7a to 7d, a set battery 300 in which a plurality of single batteries 200 having no adhesive layer are connected in series or in parallel is put into the pack 40 together with adhesive, and then the set battery 300 is packaged with its anode and cathode taps being respectively connected to an anode terminal 44a and a cathode terminal 44b of a cover 44. Here, the processes of connecting the anode/cathode taps 18a and 18b of the single battery 200 in series or in parallel, receiving the battery 200 or 300 into the pack 40 and forming the adhesive layer 30 may be suitably changed according to the manufacturing procedure of the set battery.

EXPERIMENTAL EXAMPLE

The lithium secondary battery manufactured as described above is overcharged, and its results are examined.

At first, the lithium secondary battery 200 (a single battery having a regular voltage of 4.2V and a capacity of 3.3 Ah) as shown in FIG. 5 is prepared. An acrylic resin in an emulsion state is coated on the lithium secondary battery 200 by soaking the battery 200 into the resin and then dried, three times, to prepare two samples having the adhesive layer 30 for the following experiments 1 and 2. After that, two samples are overcharged under the conditions of a charging rate of 1 C and a voltage of 30V.

TABLE 1

| Samples | Weight of battery | | Thickness of battery | | Charging conditions | Results |
|---|---|---|---|---|---|---|
| | Before coating | After coating | Before coating | After coating | | |
| Experiment 1 | 65.4 g | 72.6 g | 5.4 mm | 7.7 mm | 1 C/30 V | no explosion or firing |
| Experiment 2 | 65.3 g | 73.0 g | 5.3 mm | 7.8 mm | | |

Figure 8A:
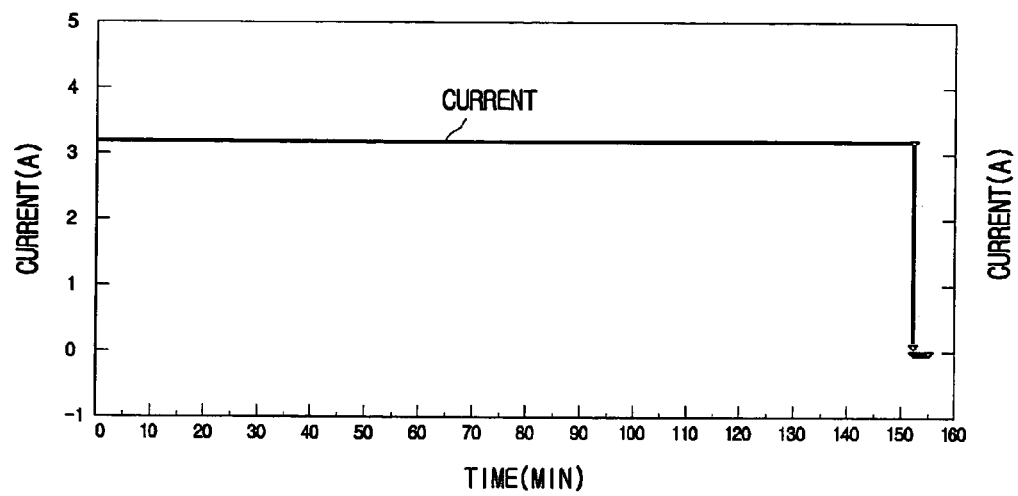
FIGS. 8a to 8c are graphs showing the change of an electric current, a voltage and a temperature according to time when the lithium secondary battery according to an embodiment of the present invention is overcharged.
Figure 8B:
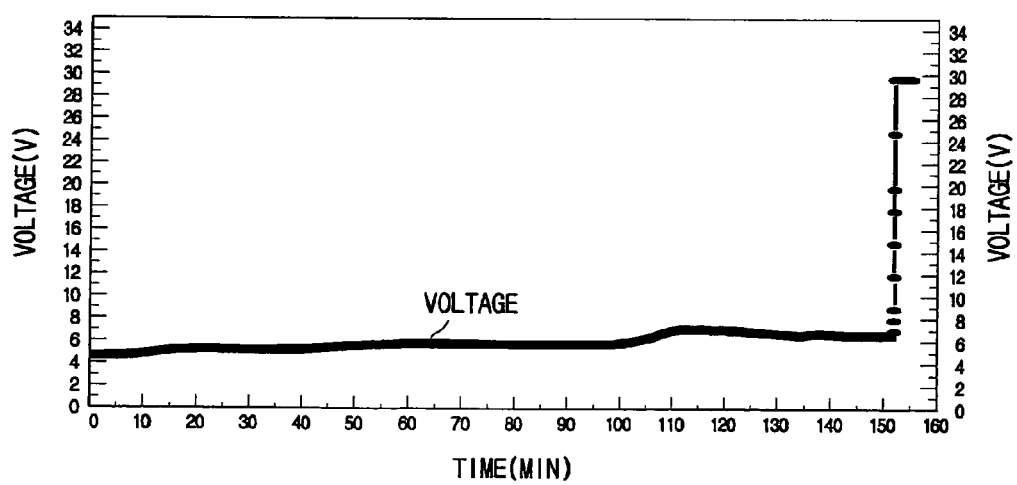
Figure 8C:
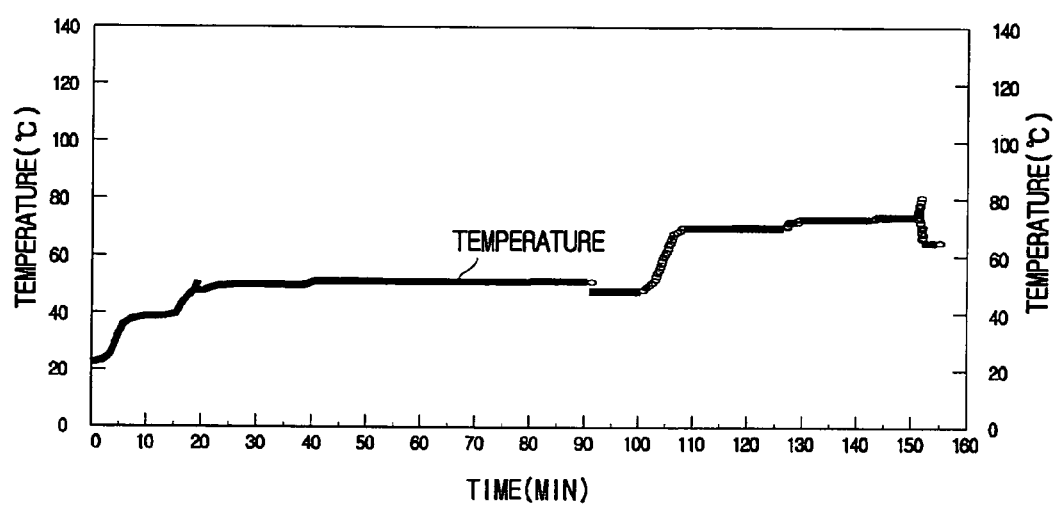

FIGS. 8a to 8c are graphs showing the change of an electric current, a voltage and a temperature according to a charging time of the lithium secondary batteries according to the experiments 1 and 2, respectively. Showing the graphs, it will be known that the electric current reaches 0 A and the voltage reaches 30V at the instant that the charging time exceeds 150 minutes, so the batteries cannot be used any more. However, even in this state, the packages are no more than somewhat wrinkled with no explosion or firing.

On the while, the same single battery as shown in FIG. 5 without an adhesive layer is prepared as a comparative example, and then overcharged under the same condition as above. In this case, when the voltage goes over 5.8V, gas is generated in the battery to make the package expanded. In addition, when it passes about 90 minutes, the package is exploded with a voltage of about 6V.

From the experimental results, it is understood that the adhesive layer formed on the surface of the package of the battery acts a role of preventing firing or explosion of the battery by controlling expansion of the package due to its strong cohesive force.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

APPLICABILITY TO THE INDUSTRY

The lithium secondary battery described above may prevent its package from exploding due to abrupt breakage of the package when the package is expanded due to the increase of inner pressure of the battery over a critical value by forming an adhesive layer having strong cohesive force on the outer surface of the package. Thus, the present invention may realize an explosion-proof safety function with a much simpler structure at a much smaller cost than the conventional complicated explosion-proof safety device.

What is claimed is:

1. A lithium secondary battery comprising:
    an electrode assembly having an anode plate, a cathode plate and a separator, the anode plate and the cathode plate being respectively connected to an anode tap and a cathode tap;
    a package having a receiving portion for receiving the electrode assembly, the receiving portion being sealed and filled with electrolyte together with the electrode assembly, the package being adapted to be put into a pack having anode and cathode terminals, the anode tap and the cathode tap being protruded from the package; and
    an adhesive coating layer at least partially coated on a substantial portion of an outer surface of an outer layer of the package, except for the anode tap and the cathode tap, for restraining shrinkage or expansion of the package.

2. A lithium secondary battery according to claim 1, wherein the adhesive coating layer is made of one selected from the group consisting of acrylic resin, EVA (Ethylene Vinyl Acetate) resin, polyamide resin, and rubber.

3. A lithium secondary battery according to claim 1,
    wherein the separator is made of a single sheet, folded in a shape of fold-to-fold,
    wherein the electrode assembly is configured so that a plurality of the anode plates and a plurality of the cathode plates are laminated in turns with the folded separator being interposed therebetween.

4. A lithium secondary battery comprising:
    an electrode assembly having an anode plate, a cathode plate and a separator, the anode plate and the cathode plate being respectively connected to an anode tap and a cathode tap;
    a package having a receiving portion for receiving the electrode assembly, the receiving portion being sealed and filled with electrolyte together with the electrode assembly, the package being adapted to be put into a pack having anode and cathode terminals, the anode tap and the cathode tap being protruded from the package; and
    restraining adhesion means for restraining shrinkage or expansion of the package, the restraining adhesion means being at least partially coated on a substantial portion of an outer surface of an outer layer of the package except for the anode tap and the cathode tap.

5. A lithium secondary battery according to claim 4, wherein the restraining adhesion means is made of one selected from the group consisting of acrylic resin, EVA (Ethylene Vinyl Acetate) resin, polyamide resin, and rubber.

6. A lithium secondary battery according to claim 4,
wherein the separator is made of a single sheet, folded in a shape of fold-to-fold,
wherein the electrode assembly is configured so that a plurality of the anode plates and a plurality of the cathode plates are laminated in turns with the folded separator being interposed therebetween.

7. A lithium secondary battery according to claim 1, wherein the adhesive coating is coated on a majority of the outer surface of the package.

8. A lithium secondary battery according to claim 4, wherein the restraining means is coated on a majority of the outer surface of the package.

9. A lithium secondary battery according to claim 4, wherein the restraining means is coated on substantially all of the outer surface of the package.

10. A lithium secondary battery according to claim 1, wherein the adhesive coating is coated on substantially all of the outer surface of the package.

* * * * *